(12) United States Patent
Elmegreen et al.

(10) Patent No.: US 11,483,387 B2
(45) Date of Patent: Oct. 25, 2022

(54) SENSOR-BASED COMMUNICATIONS NETWORK FOR REMOTE AND UNDERGROUND LOCATIONS

(71) Applicant: International Business Machines Corporation, Armonk, NY (US)

(72) Inventors: Bruce Gordon Elmegreen, Goldens Bridge, NY (US); Levente Klein, Tuckahoe, NY (US); Sufi Zafar, Briarcliff Manor, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/924,267

(22) Filed: Jul. 9, 2020

(65) Prior Publication Data

US 2022/0014590 A1 Jan. 13, 2022

(51) Int. Cl.
*H04L 29/08* (2006.01)
*H04W 4/38* (2018.01)
*H04L 5/00* (2006.01)
*H04L 67/12* (2022.01)

(52) U.S. Cl.
CPC ............ *H04L 67/12* (2013.01); *H04L 5/0005* (2013.01); *H04L 5/0044* (2013.01); *H04W 4/38* (2018.02)

(58) Field of Classification Search
CPC ..... H04L 67/12; H04L 5/0005; H04L 5/0044; H04L 29/08; H04L 5/00; H04W 4/38
USPC ....................................................... 709/224
See application file for complete search history.

(56) References Cited

U.S. PATENT DOCUMENTS

| 8,115,622 B2 | 2/2012 | Stolarczyk et al. |
| 9,389,260 B2 | 7/2016 | Potyrailo et al. |
| 2010/0060429 A1* | 3/2010 | Hines ............... G06K 19/0672 340/10.1 |
| 2010/0227557 A1* | 9/2010 | Won ........................ H04Q 9/00 455/41.2 |

(Continued)

FOREIGN PATENT DOCUMENTS

| CN | 202710488 U | 1/2013 |
| CN | 204178544 U | 2/2015 |
| KR | 101037433 B1 | 5/2011 |

OTHER PUBLICATIONS

Wikipedia, "Ground-penetrating radar," URL: https://en.wikipedia.org/wiki/Ground-penetrating_radar; Received: Jan. 3, 2022; 5 pages.

(Continued)

*Primary Examiner* — Tonia L Dollinger
*Assistant Examiner* — Mehulkumar J Shah
(74) *Attorney, Agent, or Firm* — Cantor Colburn LLP; Joseph Petrokaitis (57) ABSTRACT

Aspects of the invention include using a controller to control a transceiver to transmit a sensor query signal to a first sensor at a first location of one or more locations having one or more sensors, wherein the sensor query signal energizes a first power supply for the first sensor, wherein energizing the power supply causes the first sensor to perform a sensor reading at the first location and transmit to the transceiver an encoded response signal representing the sensor reading, and analyzing, using the controller, the encoded response signal to determine the sensor reading at the first location.

16 Claims, 7 Drawing Sheets

(56) References Cited

U.S. PATENT DOCUMENTS

| | | | |
|---|---|---|---|
| 2013/0012231 A1* | 1/2013 | Hall | H04W 4/021 |
| | | | 455/456.2 |
| 2015/0181315 A1 | 6/2015 | Vuran et al. | |
| 2018/0013048 A1 | 1/2018 | Insanic et al. | |
| 2018/0167224 A1 | 6/2018 | Brandt | |
| 2018/0242253 A1* | 8/2018 | Jetcheva | H04W 52/0235 |
| 2019/0168787 A1* | 6/2019 | Messinger | B61L 15/0081 |
| 2020/0007384 A1* | 1/2020 | Mueck | H04L 43/50 |
| 2020/0117863 A1* | 4/2020 | Ha | G06K 19/07771 |
| 2020/0132658 A1* | 4/2020 | Koch | G01N 33/246 |
| 2020/0217666 A1* | 7/2020 | Zhang | G01C 21/165 |
| 2020/0380326 A1* | 12/2020 | Kawaguchi | G06K 19/0723 |
| 2021/0345038 A1* | 11/2021 | Ghaffarivardavagh | H04R 1/44 |

OTHER PUBLICATIONS

Wikipedia, "Radio-frequency identification," URL: https://en.wikipedia.org/wiki/Radio-frequency_idenfication; Received: Jan. 3, 2022; 15 pages.

* cited by examiner

FIG. 7

SENSOR-BASED COMMUNICATIONS NETWORK FOR REMOTE AND UNDERGROUND LOCATIONS

BACKGROUND

The present invention generally relates to network communications systems, and more specifically, to a sensor-based communications network for collecting data in remote locations, including underground remote locations that are difficult to access.

Collecting data in remote locations can present a challenge due to communication signal availability and attenuation. Remote locations include locations that are difficult to access for placing sensors and for maintaining these sensors. These locations can include, for example, underwater locations and underground locations. Data associated with underground locations can be of particular interest in agricultural, oil and gas, buried facilities, and mining application. This practice is known as soil monitoring in case of agriculture where the signal is propagated within the soil or soil/atmosphere interface rather than through the air.

Soil monitoring involves the collection and/or analysis of soil and its associated quality, constituents, and physical status to determine or guarantee its fitness for use. Soil faces many threats, including compaction, contamination, organic material loss, biodiversity loss, slope stability issues, erosion, salinization, and acidification. Soil monitoring helps characterize these threats and other potential risks to the soil, surrounding environments, animal health, and human health.

SUMMARY

Embodiments of the present invention are directed to a method for monitoring sensors in remote locations. A non-limiting example computer-implemented method includes using a controller to control a transceiver to transmit a sensor query signal to a first sensor at a first location of one or more locations having one or more sensors, wherein the sensor query signal energizes a first power supply for the first sensor, wherein energizing the power supply causes the first sensor to perform a sensor reading at the first location and transmit to the transceiver an encoded response signal representing the sensor reading, and analyzing, using the controller, the encoded response signal to determine the sensor reading at the first location.

Embodiments of the present invention are directed to a system for monitoring sensors in remote locations. A non-limiting example system includes one or more processors for executing the computer readable instructions, the computer readable instructions controlling the one or more processors to perform operations including operating a transceiver to transmit a sensor query signal to a first sensor at a first location of one or more locations having one or more sensors, wherein the sensor query signal energizes a first power supply for the first sensor, wherein energizing the power supply causes the first sensor to perform a sensor reading at the first location and transmit an encoded response signal representing the sensor reading, and analyzing the encoded response signal to determine the sensor reading at the first location.

Embodiments of the present invention are directed to a computer program product for monitoring sensors in remote locations, the computer program product including a computer readable storage medium having program instructions embodied therewith. The program instructions are executable by a processor to cause the processor to perform a method. A non-limiting example of the method includes using a controller to control a transceiver to transmit a sensor query signal to a first sensor at a first location of one or more locations having one or more sensors, wherein the sensor query signal energizes a first power supply for the first sensor, wherein energizing the power supply causes the first sensor to perform a sensor reading at the first location and transmit to the transceiver an encoded response signal representing the sensor reading, and analyzing, using the controller, the encoded response signal to determine the sensor reading at the first location.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams, or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide a sensor system configured to address, read, and charge a vast network of underground sensors where each sensor can be addressed individually. In aspects of the invention, the underground sensors include integrated power harvesting functionality and are not required to be communicatively coupled to each other by wires or wireless communication. Each underground sensor in the system can be scanned from a central point or, for example, by programmable drones or by a processing station that can be located underground or above ground. In embodiments of the invention, the sensor includes a circuit configured to enable recharging of the sensor and further configured to enable the sensor to take measurements. The circuit further includes communication and sensing functionality that can be coordinated such that powering up the sensor triggers the circuit to, during the scanning process, take measurements and transmit the data of the measurements back to the central processing location. The data transmission can happen underground or being partially propagated underground and then further transmitted through the atmosphere. Accordingly, in aspects of the invention, the communications functionality of the sensors utilizes low frequency radio communication techniques and inductive charging of power supplies. The use of low frequency radio signals allow such signals to penetrate deeply underground, which allows the sensors to be placed at a depth conducive to obtaining relevant soil characteristics (e.g., temperature, moisture, soil content, pH level, and the like) and at a depth that ensures the sensor can stay in that locations for an extended period of time and will not be disturbed by plows, combines, and other types of surface machinery.

Turning now to an overview of technologies that are more specifically relevant to aspects of the invention, in agricultural science, it is often necessary to understand the chemical and biotic compositions of the soil in which crops are grown. However, in order to fully sample the diversity and time dependence of the soil's moisture and nutrient properties, known sensor systems require embedding sensors in the soil over many hundreds of acres to obtain the soil's chemical and biotic composition on a regular basis for a long period of time. These sensors are required to measure the conditions similar to what plants roots may experience where the soil was not disturbed for a longer period of time. Access to the data collected by these embedded sensors can be challenging due to their remote locations and signal attenuation in gigahertz (GHz) range in the soil. Known approaches to embedding sensors in soil and accessing the data gathered by the sensors are labor intensive and can require cumbersome communications structures.

Turning now to an overview of aspects of the invention, one or more embodiments of the invention address the shortcomings described above by providing a sensor network that can be placed in remote locations to collect and transmit sensor data associated with the remote location to a central location. The sensor network includes sensors that can be placed underground and are stable enough in their measurements to last a long period of time without the need for extraction for calibration and charging. These sensors are addressable by remote means and have the ability to communicate sensors data to a central location for analysis.

Embodiments of the invention incorporate ground penetrating radar or signals, which can be utilized to detect objects underground that stand out because of their electric permittivity contrasted with the background. The radar or signal is able to address individual sensor locations. In embodiments of the present invention, a central transceiver is aware of the location of each sensor, and the location is stored in a local database or metafile. In one embodiment of the present invention, the central transceiver orients a focused beam of radio frequency (RF) signal to a particular location to address a specific sensor. With an aperture array radio system or other transceivers, radio beams can be directed toward many sensors at the same time. In another embodiment of the present invention, the central transceiver emits a wide-angle radio frequency beam that can reach several sensors at the same time, and the central receiver uses well-defined frequencies that are characteristic for each sensor so only the intended sensor processes each signal. Many frequencies activating many different sensors can be emitted by the central transceiver simultaneously. For example, if there are several sensors at each of several locations, then a directed beam can point to each location and the different frequencies can select each sensor at that location. The system is location aware of all sensors scattered in the field at every moment of time. Low frequencies, such as 10 MHz, penetrate further than higher frequencies (e.g., GHz); however, low frequencies have lower spatial resolution which is about a wavelength in size.

Aspects of the present invention utilize a sensor network including individual sensors for soil monitoring, for example, which do not require high spatial resolution but only addressability. This allows for the benefit of the depth penetration by lower frequencies. One or more embodiments of the present invention includes a system of low frequency radio communication and inductive charging sensors that can be placed several meters underground. This system can utilize radio frequency identification (RFID). With frequencies ranging from kHz to MHz or higher, the principles of RFID generation, detection, and transmission can be applied to underground sensors. The system utilizing this sensor network can provide for addressing, reading, and charging a potentially vast network of underground sensors that are not connected to each other by wires or wireless communication and which have integrated power harvesting capabilities. In one or more embodiments of the present invention, each sensor can be scanned from a central point or by programmable vehicles, and during the scanning process, can be recharged in power by a circuit that also enables the sensor to take a measurement. The communication and sensing are integrated such that when the sensor is powered up, the sensor will also take the measurement and transmit the data back to a central processing location during this scanning process.

Figure 1:
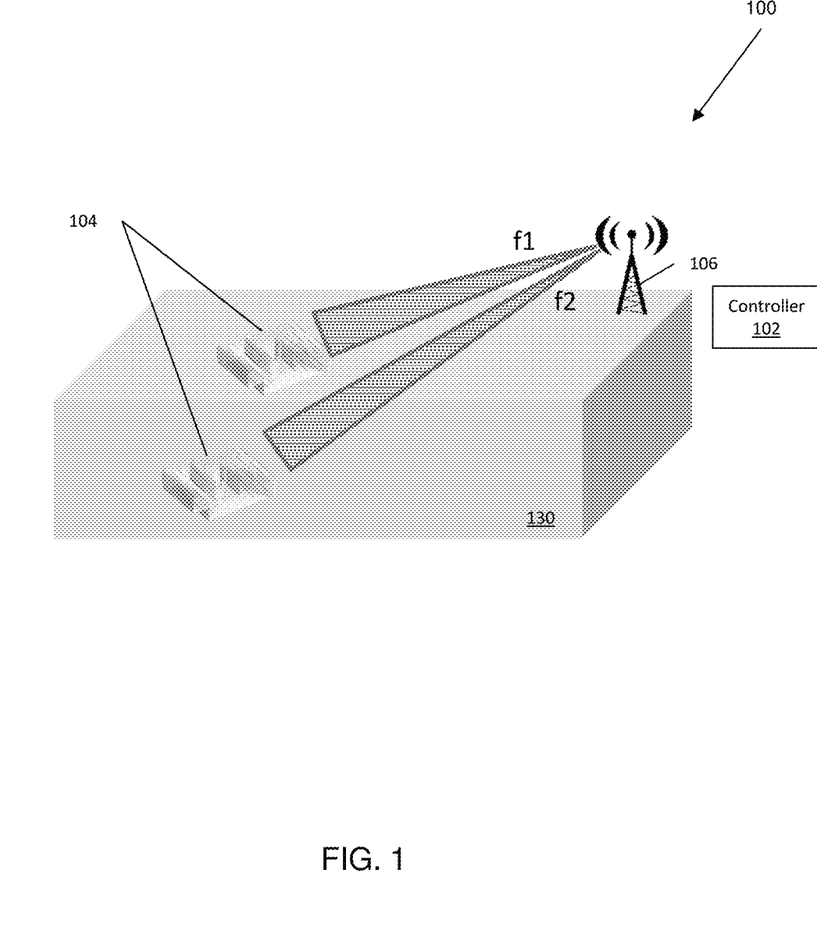
FIG. 1 depicts a system for monitoring sensors in remote locations according to one or more embodiments of the present invention.

Turning now to a more detailed description of aspects of the invention, FIG. 1 depicts a system 100 for monitoring sensors in remote locations in accordance with one or more embodiments of the present invention. The system 100 includes a controller 102 that is configured to receive and analyze sensor data gathered by a network of sensors 104 located remotely from the controller 102. Each sensor in the system is addressed by the controller 102 in a way that triggers the sensor to activate, take a measurement and send the measurement signal back. In embodiments of the invention, the sensors 104 can be embedded underground in soil 130. In some embodiments of the present invention, the network of sensors 104 can be located in other remote locations such as, for example, underwater. In one or more embodiments of the invention, the system 100 includes a transceiver 106 that is configured to transmit one or more signals f1 and f2 and receive response signals from the network of sensors 104. The controller 102 is communicatively coupled to the transceiver 106 and can be located at the transceiver 106 or can be located remote from the transceiver 106.

In one or more embodiments of the present invention, the transceiver 106 is configured to transmit a radio frequency (RF) signal that is specifically assigned to one of the buried sensors 104. This RF signal, from the transceiver 106, will activate the particular sensor 104. For example, the RF signal could have a different frequency for each buried sensor 104, allowing each buried sensor 104 to be addressed separately by the transceiver 106. The sensors 104 can include a receiving resonant circuit loop that is tuned to a specific frequency and as an RF signal is absorbed having said frequency (e.g., f1), power is generated in the resonant circuit. This power generated can temporarily charge a local battery for the sensor, or for immediate read-out, can charge a local capacitor that can quickly drain into the circuit to provide needed current to obtain a sensor reading and transmit the sensor reading to the transceiver 106. To achieve this, each sensor 104 will have distinctive resonant frequencies and the transceiver 106 sends separate RF signals to address each sensor 104. There may be one or more transceivers 106 in the field where each of them can receive a signal from the sensor 104. Based on the directionality of the signal received and the time of signal flight, the system 100 can triangulate to identify the sensor location underground. The power can actuate a voltage or current-controlled switch that can enable power flow to the sensor 104. In one or more embodiments of the present invention, the sensors can be a pH sensor, nitrogen sensor, or other chemical sensor that is operated at very low power (e.g., less than a micro Amp of current at a voltage less than 1 V). A measurement can be taken of either the pH signal or the soil chemical level. In most cases, this information can be in the form of a few digit numbers like a three-digit number (e.g., 7.21 pH level). This number can be divided into discrete intervals where each digit will have a well-defined characteristic such as, for example, frequency or modulation of the signal interval length.

Figure 2:
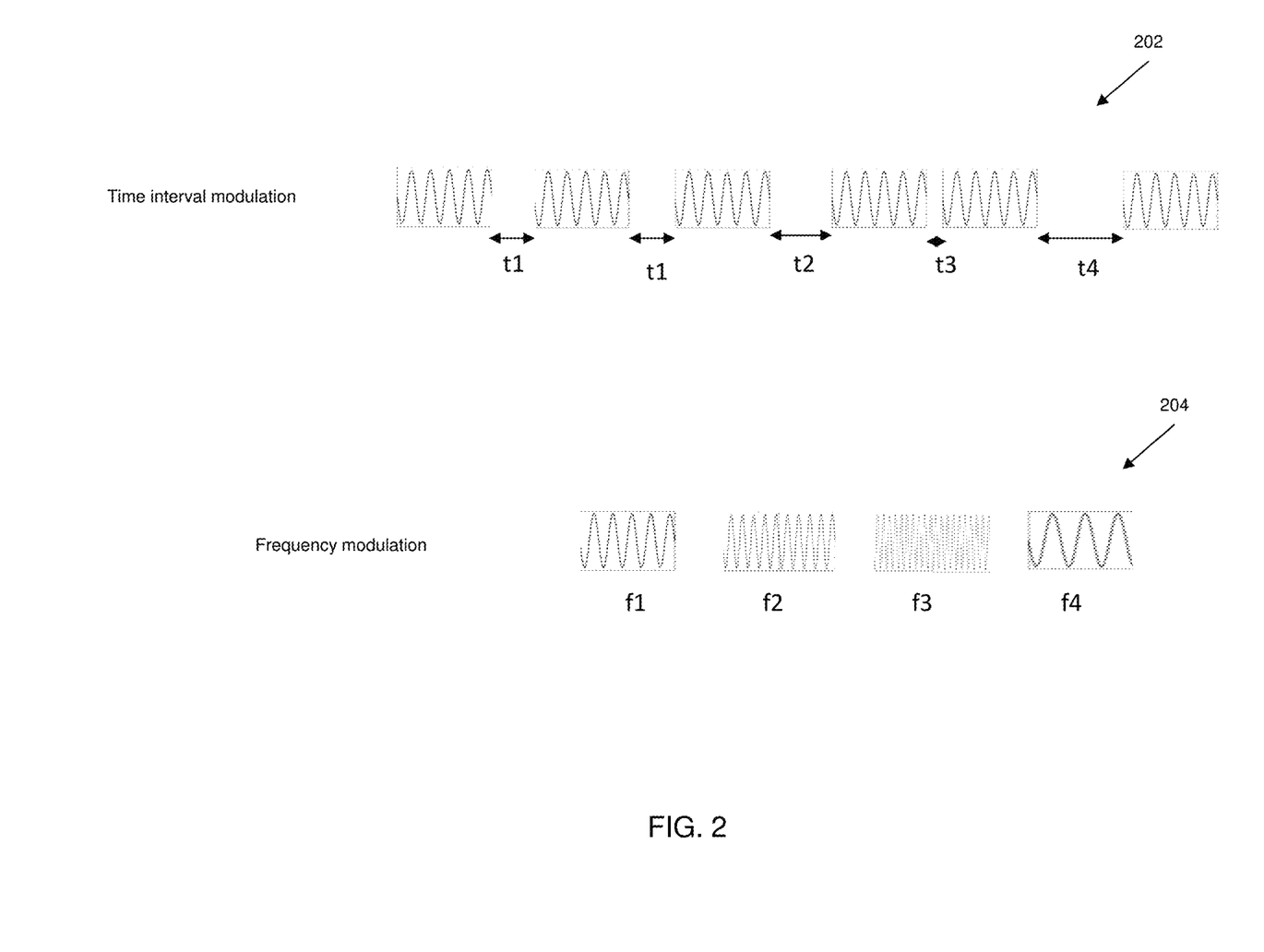
FIG. 2 depicts exemplary encoded signals using time interval length and frequency modulation according to one or more embodiments of the present invention.

As noted above, low frequencies, such as 10 MHz, penetrate further than higher frequencies (e.g., GHz); however, low frequencies have lower spatial resolution which is about a wavelength in size. To account for this lower spatial resolution, in one or more embodiments of the invention, the sensor 104 response can be an encoded signal in the lower frequency where characteristics of the encoded signal will include the sensor data in the form of a few digits number to convey the value of the sensor and also an identification of the type or location of the sensor. For example, the encoded response signal can be transmitted back to the transceiver 106 by a time interval modulation. That is to say, the time interval length is modulated where the time interval length will contain the information about the measurement as well as a sensor identifier that can indicate a type and location of the sensor. This signal can be decoded by the controller 102 after it is received by the transceiver 106. This decoding can then produce the three-digit number of, for example, 7.21 pH level as well as a few other digits for the sensor ID. In one or more embodiments of the present invention, the sensor 104 response can be transmitted back to the transceiver 106 using a frequency modulation. For a frequency modulation, each number (in the three-digit number, for example) can have a well-defined interval shift from the base frequency with a unique value and the readings are sent at fixed interval pulses with different frequencies that encode the measured few digits number. FIG. 2 depicts exemplary encoded signals using time interval length and frequency modulation according to one or more embodiments of the present invention. The time interval encoded signals 202 has the same frequency but the time t1, t2, t3, and t4 between signals of a set length (e.g., pulse) is modulated to encode a digit value for the sensor reading and sensor ID. For example, the time t between signals can be decoded to represent a value for the sensor reading and also a code for the location of the sensor or other information about the sensor. Here, with four time-lengths (t1, t2, t3, t4), a four digit number can be determined or a fewer digit number is determined where one of the time lengths indicates a decimal, etc. The frequency encoded signal 204 has the same time between signals and the same signal length, but the frequencies (f1, f2, f3, f4) are different. These frequencies can be decoded to represent a sensor reading by the controller 102. A combination of time modulation and frequency modulation can also be used to encode information in the signal. The system 100 can be configured such that the controller 102 issues a command and after a fixed time interval the sensor network responds. The time gap can be configured for each sensor such that the time delay of the signal propagation can be calculated. The time delay is proportional to the soil properties and is an indicator of the distance and soil moisture content. The time delay can be used to extract measurement parameters that may not be measured directly by the sensor.

Referring back to FIG. 1, the sensors 104 can be addressed, charged, and read utilizing the above-ground transceiver 106 that includes a power supply, data storage, and computational complexity (i.e., the controller 102) required to fully utilize the network of sensors 104. The controller 102 or any hardware in system 100 can be implemented by executable instructions and/or circuitry such as a processing circuit and memory. The processing circuit can be embodied in any type of central processing unit (CPU), including a microprocessor, a digital signal processor (DSP), a microcontroller, an application specific integrated circuit (ASIC), a field programmable gate array (FPGA), or the like. Also, in embodiments, the memory may include random access memory (RAM), read only memory (ROM), or other electronic, optical, magnetic, or any other computer readable medium onto which is stored data and algorithms as executable instructions in a non-transitory form.

In one or more embodiments of the present invention, the transceiver 106 can include a directional dish that can be operated to face a location for each sensor 104 to transmit a specific frequency (e.g., f1, f2, etc.) to each individual sensor 104. The directional dish can transmit a steerable beam tuned to the resonant frequency of the sensor 104. This resonant frequency signal transmitted by the transceiver 106 essentially queries the sensor by "waking" up the sensor by powering the RF components on the sensor allowing for a voltage/current/frequency/radiation-controlled switch to initiate a sensor reading and transmitting back to the transceiver 106. One or multiple transceivers can be operated to determine the directionality of the signal transmitted back and determine the sensor location from where the signal is initiated.

Figure 3:
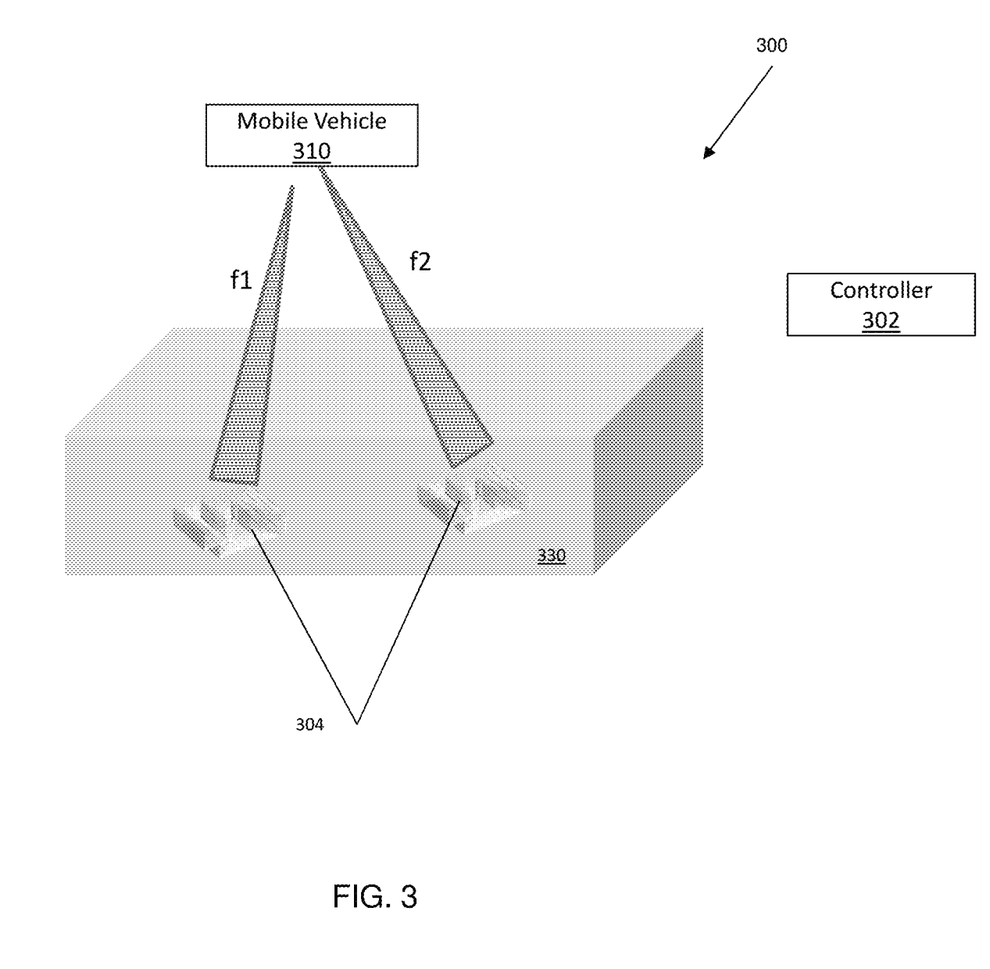
FIG. 3 depicts a system for monitoring sensors in remote locations according to one or more embodiments of the invention.

FIG. 3 depicts an alternate embodiment of the system for monitoring sensors in a remote location. The system 300 includes a controller 302 that can be part of a larger control system for monitoring and storing data associated with the soil 330. The sensors 304 are placed underground in a position and network that allows for collection of data associated with the soil 330 and avoids disturbances from ground equipment. A mobile vehicle 310 having a reader-charger can be utilized to transmit an RF signal to the sensors 304 and receive responsive sensor readings. As previously mentioned, low frequencies are utilized to be able to penetrate the ground to reach the underground sensors 304. Also, the beam transmitted by the mobile vehicle 310 may be focused such that only sensors located within a certain area can respond to the signal. In that case, if sensors are outside of the scanned area, they will stay idle until the mobile device hovers over them and inquires their status. Since multiple sensors may be in the ground, the mobile device may tune the frequency such that it can isolate each individual sensor signal from that area. The low frequencies are in the range of 10 MHz to 100 MHz or more. Because the wavelength of 10 MHz radiation is roughly 30 meters, the reader-charger can be several meters above ground in a flying drone (mobile vehicle 310), for example. In some embodiments of the invention, the reader-charger can be mounted on farm equipment that routinely passes over the sensors 304 such as, for example, moving irrigation or pesticide machinery. That is to say, the mobile vehicle 310 could be land based vehicles (farm equipment) or aerial vehicles (e.g., flying drones). A flying drone can move at speeds of up to 30 meters per hour and can operate for roughly 20 minutes. If a flying drone hovers over a sensor 304 on average for one minute to both charge and collect the sensor reading, then the drone could cover a distance of up to five miles reading and charging up to 10 sensors before returning to a base station. Several drones could operate simultaneously in pre-programmed patterns.

In one or more embodiments of the present invention, the sensors 304 can be any type of sensor including, but not limited to, a pH level sensor, a nitrogen level sensor, a moisture sensor, and a temperature sensor. The sensors 304 includes a horizontally-aligned charging coil that converts pulsed electromagnetic (EM) radiation from another coil in the reader-charger into a current/voltage for both sensor operation and battery recharging. The sensor can be equipped with measurement devices for physical quantities of interest such as, for example, temperature, pH, moisture, nitrates, and other chemicals, including pesticides. The sensors 304 can include local storage to contain the latest measurement. The contents of this storage can read by the reader-charger.

One approach to reading the sensor is by measuring the sensing signal change. Another approach is by measuring the impedance of the sensor. The impedance is determined by a combination of resistance, inductance and capacitance in the sensor circuit, any of which may be changed to encode the sensor value giving a different impedance for each value. For a fixed wire loop transceiver in the sensor for the radio waves, the inductance may be fixed by the wire loop and then the sensor value may be stored in some combination of resistance and capacitance in a circuit connected to the wire loop. Alternatively, an additional inductor could be in the sensor circuit. The incident radio wave from the reader/charger will resonate with the sensor circuit, causing a current and possibly charging a battery in the sensor, but it will also produce a reflectance of radio waves at the same frequency back to the reading device. The wave phase of that reflectance will depend on the complex impedance in the sensor circuit and therefore it will depend on the resistance, inductance and capacitance in the sensor circuit, which encode the sensor value. The signal that is transmitted back from the sensor can be at the same frequency as the excitation signal or it can be slightly shifted or modulated. The receiver will look for a return signal within a certain bandwidth centered on the frequency of the original excitation signal, or within some other specified frequency interval, and it will identify the sensor from which the signal is generated and decode the transmitted information. The sensor circuitry can dynamically change the impedance by adding or removing additional looped elements through a switch circuit. These circuit additions or removals can couple or decouple segment that can be elements of resistance or capacitances that would increase the overall impedance of the circuit. The increased impedance will change the resonant frequency of the circuit such that acquired data transmission will happen on a different frequency compared to the excitation frequency. The new resonant frequency can be communicated to the central control node that will expect a communication of a new frequency channel. Each resonant frequency can be tailored specifically for a node such that they can be identified uniquely. These switching can be used also to modulate frequency on a well-defined pattern and encode information into the frequency patterns.

Turning back to FIG. 1, in one or more embodiments of the present invention, the system 100 can also measure the attenuation of the RF signal as an indicator of moisture level in the soil. Moisture on the path between the sensor 104 and transceiver 106 will decrease the RF signal received. Given a library of signal strengths acquired at different soil moisture levels, a computer program or neural network can be trained to assess the current moisture level near each sensor. Further, the moisture information can be used by the pH and chemical sensors, or by the temperature sensors, to calibrate the sensors 104 and compensate for their possible dependence on soil moisture and temperature.

Figure 4:
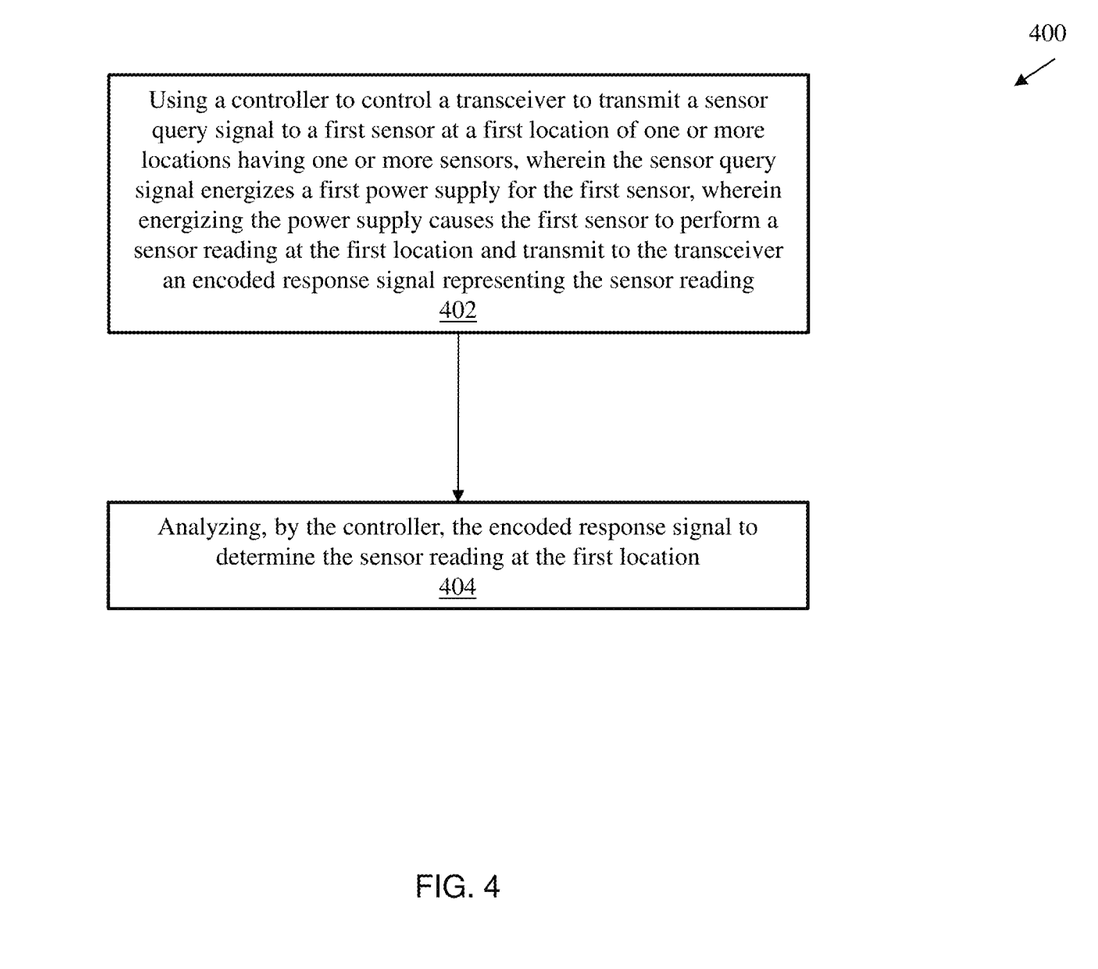
FIG. 4 depicts a flow diagram of a method for monitoring a network of sensors according to one or more embodiments of the invention.

FIG. 4 depicts a flow diagram of a method for monitoring a network of sensors according to one or more embodiments of the invention. At least a portion of the method 300 can be executed, for example, by the controller 102 shown in FIG. 1. The method 400 includes using a controller to control a transceiver to transmit a sensor query signal to a first sensor at a first location of one or more locations having one or more sensors, wherein the sensor query signal energizes a first power supply for the first sensor, wherein energizing the power supply causes the first sensor to perform a sensor reading at the first location and transmit to the transceiver an encoded response signal representing the sensor reading, as shown in block 402. The transceiver can transmit by a directional dish that transmits an RF signal to the sensor to initiate a reading by powering up the sensor using RF technology. In other embodiments, the transceiver can be attached to a drone or mobile vehicle to access the sensor at the first location. The encoded response signal can be sent responsive to the query signal from the transceiver which powers up the sensor. And at block 406, the method 400 includes analyzing, by the controller, the encoded response signal to determine the sensor reading at the first location.

Additional processes may also be included. It should be understood that the processes depicted in FIG. 4 represent illustrations, and that other processes may be added, or existing processes may be removed, modified, or rearranged without departing from the scope and spirit of the present disclosure.

The system can learn after a period of time the location of each sensor and the characteristics of the returned signal like strength, frequency and delay time. If a disturbance occurs in the soil, the sensor depth may change, or the sensor may accidentally be relocated. In such cases the central controller 102 will scan all directions to determine the new location of the sensor and its altered characteristics, which will be stored in a local database or metafile. Furthermore, at the central location (e.g., location of the controller 102), the returned signal strength is stored for each sensor. Variations in the returned signal strength can be an indicator of an overall change in soil properties (like irrigation or the application of fertilizers) that may attenuate the returned signal strength in a new way. In such a scenario, the system 100 can assess the change in soil properties on a relative scale and correlate these changes with other timely information, such as that obtained from a weather station.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
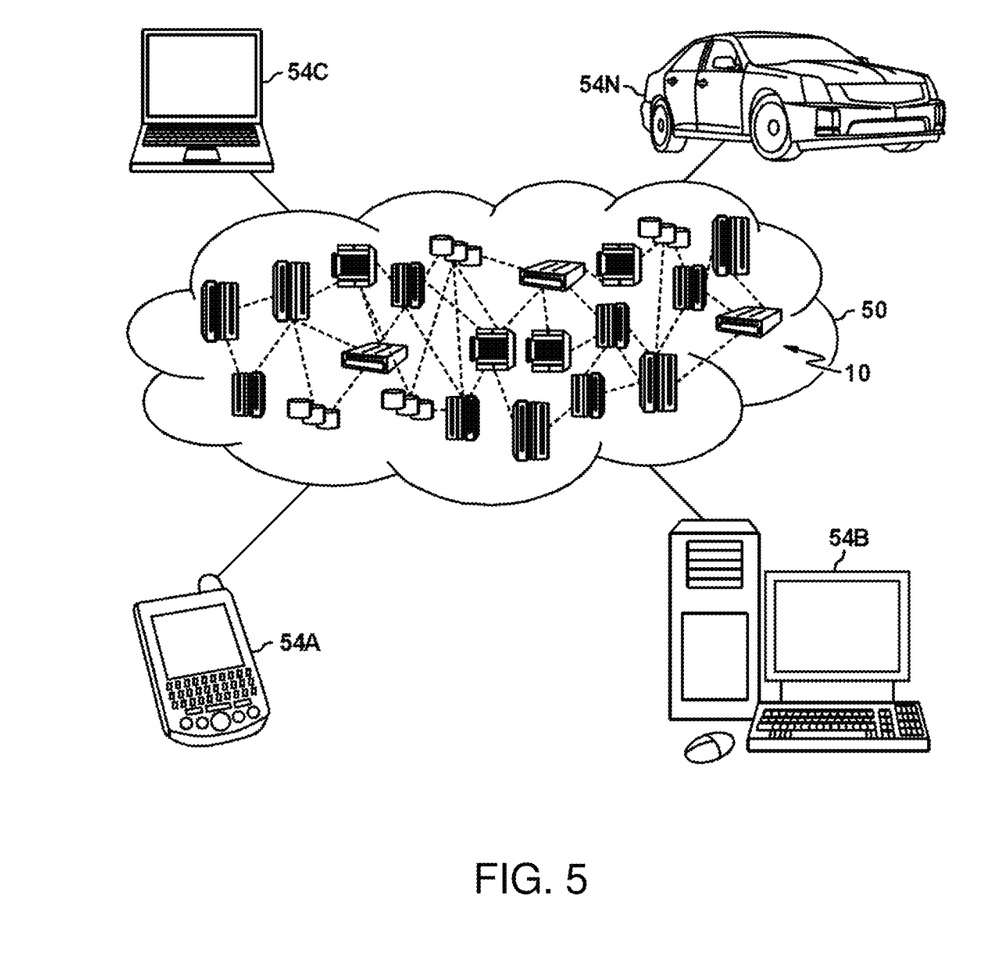
FIG. 5 depicts a cloud computing environment according to one or more embodiments of the invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
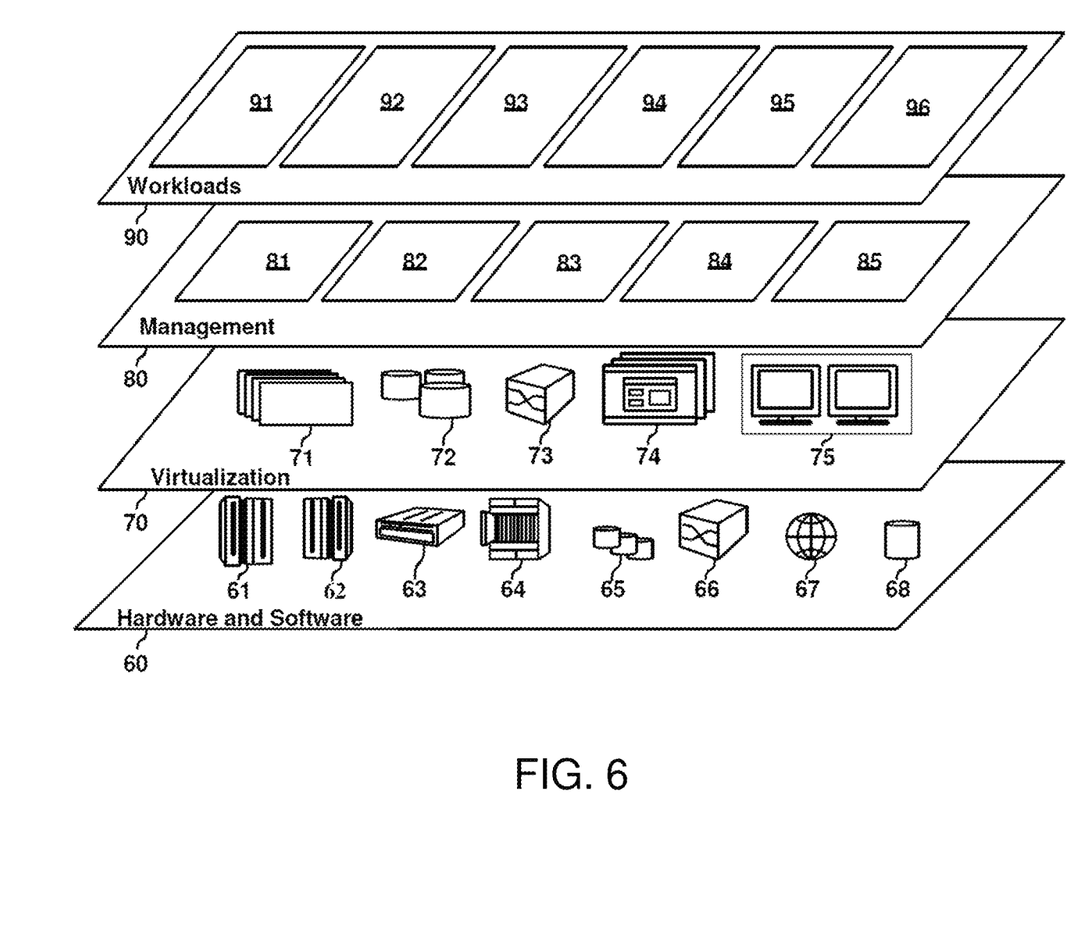
FIG. 6 depicts abstraction model layers according to one or more embodiments of the invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and monitoring and communicating with a network of sensors in a remote location 96.

Figure 7:
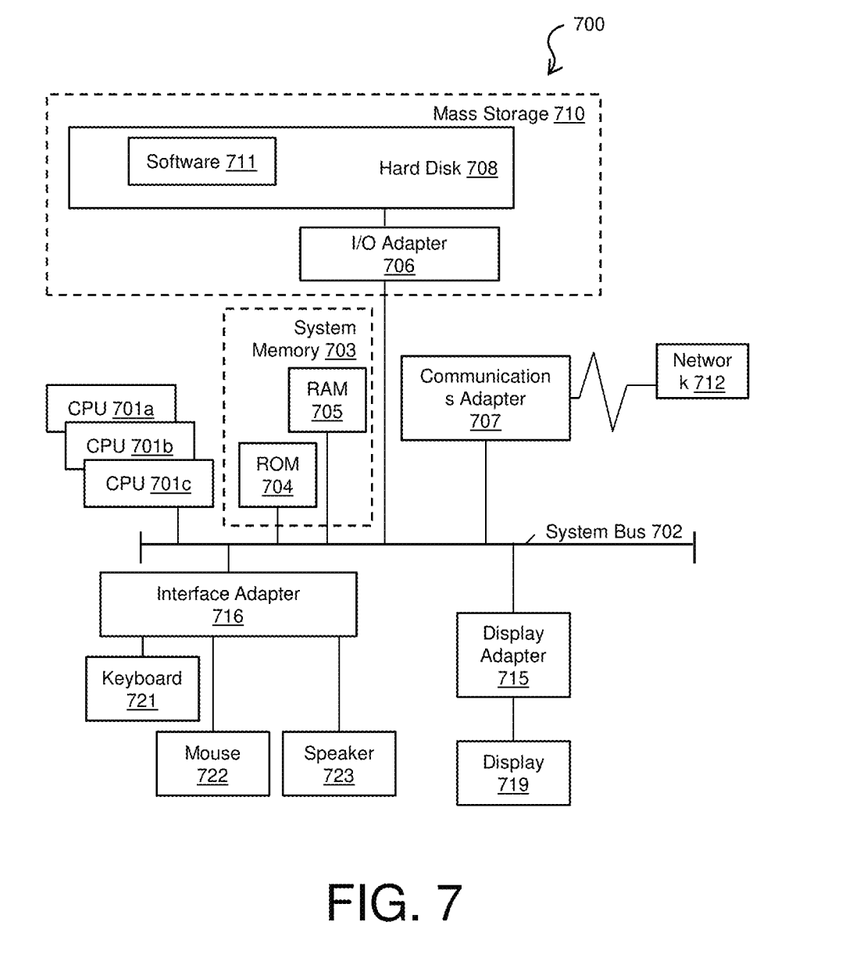
FIG. 7 depicts a block diagram of a computer system for use in implementing one or more embodiments of the invention.

In one or more embodiments of the present invention, the controller 102 and any of the hardware/software modules in the system 100 from FIG. 1 can be implemented on the processing system 700 found in FIG. 7. Turning now to FIG. 7, a computer system 700 is generally shown in accordance with an embodiment. The computer system 700 can be an electronic, computer framework comprising and/or employing any number and combination of computing devices and networks utilizing various communication technologies, as described herein. The computer system 700 can be easily scalable, extensible, and modular, with the ability to change to different services or reconfigure some features independently of others. The computer system 700 may be, for example, a server, desktop computer, laptop computer, tablet computer, or smartphone. In some examples, computer system 700 may be a cloud computing node. Computer system 700 may be described in the general context of computer system executable instructions, such as program modules, being executed by a computer system. Generally, program modules may include routines, programs, objects, components, logic, data structures, and so on that perform particular tasks or implement particular abstract data types. Computer system 700 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, the computer system 700 has one or more central processing units (CPU(s)) 701a, 701b, 701c, etc. (collectively or generically referred to as processor(s) 701). The processors 701 can be a single-core processor, multi-core processor, computing cluster, or any number of other configurations. The processors 701, also referred to as processing circuits, are coupled via a system bus 702 to a system memory 703 and various other components. The system memory 703 can include a read only memory (ROM) 704 and a random access memory (RAM) 705. The ROM 704 is coupled to the system bus 702 and may include a basic input/output system (BIOS), which controls certain basic functions of the computer system 700. The RAM is read-write memory coupled to the system bus 702 for use by the processors 701. The system memory 703 provides temporary memory space for operations of said instructions during operation. The system memory 703 can include random access memory (RAM), read only memory, flash memory, or any other suitable memory systems.

The computer system 700 comprises an input/output (I/O) adapter 706 and a communications adapter 707 coupled to the system bus 702. The I/O adapter 706 may be a small computer system interface (SCSI) adapter that communicates with a hard disk 708 and/or any other similar component. The I/O adapter 706 and the hard disk 708 are collectively referred to herein as a mass storage 710.

Software 711 for execution on the computer system 700 may be stored in the mass storage 710. The mass storage 710 is an example of a tangible storage medium readable by the processors 701, where the software 711 is stored as instructions for execution by the processors 701 to cause the computer system 700 to operate, such as is described herein below with respect to the various Figures. Examples of computer program product and the execution of such instruction is discussed herein in more detail. The communications adapter 707 interconnects the system bus 702 with a network 712, which may be an outside network, enabling the computer system 700 to communicate with other such systems. In one embodiment, a portion of the system memory 703 and the mass storage 710 collectively store an operating system, which may be any appropriate operating system, such as the z/OS or AIX operating system from IBM Corporation, to coordinate the functions of the various components shown in FIG. 7.

Additional input/output devices are shown as connected to the system bus 702 via a display adapter 715 and an interface adapter 716 and. In one embodiment, the adapters 706, 707, 715, and 716 may be connected to one or more I/O buses that are connected to the system bus 702 via an intermediate bus bridge (not shown). A display 719 (e.g., a screen or a display monitor) is connected to the system bus 702 by a display adapter 715, which may include a graphics controller to improve the performance of graphics intensive applications and a video controller. A keyboard 721, a mouse 722, a speaker 723, etc. can be interconnected to the system bus 702 via the interface adapter 716, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 7, the computer system 700 includes processing capability in the form of the processors 701, and, storage capability including the system memory 703 and the mass storage 710, input means such as the keyboard 721 and the mouse 722, and output capability including the speaker 723 and the display 719.

In some embodiments, the communications adapter 707 can transmit data using any suitable interface or protocol, such as the internet small computer system interface, among others. The network 712 may be a cellular network, a radio network, a wide area network (WAN), a local area network (LAN), or the Internet, among others. An external computing device may connect to the computer system 700 through the network 712. In some examples, an external computing device may be an external webserver or a cloud computing node.

It is to be understood that the block diagram of FIG. 7 is not intended to indicate that the computer system 700 is to include all of the components shown in FIG. 7. Rather, the computer system 700 can include any appropriate fewer or additional components not illustrated in FIG. 7 (e.g., additional memory components, embedded controllers, modules, additional network interfaces, etc.). Further, the embodiments described herein with respect to computer system 700 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
using a controller to control a transceiver, disposed on a land based mobile vehicle, to transmit a sensor query signal to a first sensor, disposed underground, at a first location of one or more locations having one or more sensors, wherein the sensor query signal is a focused radio frequency (RF) beam that has a direction based on the first location, wherein the sensor query signal energizes a first power supply for the first sensor;
wherein energizing the power supply causes the first sensor to perform a sensor reading at the first location and transmit to the transceiver an encoded response signal representing the sensor reading, wherein the encoded response signal comprises a first response frequency, and wherein the first response frequency is generated based on a reflectance of the sensor query signal from an impedance of the first sensor; and
analyzing, using the controller, the encoded response signal to determine the sensor reading at the first location and an identity of the first sensor, wherein the identity of the first sensor is determined based on the first response frequency being within a first bandwidth,
wherein the first sensor is configured to monitor a temperature, a moisture, a soil content, and a pH level of a soil.

2. The computer-implemented method of claim 1, wherein the encoded response signal representing the sensor reading comprises a set of signal pulses having a first length with a modulated length of time between each signal pulse in the set of signal pulses.

3. The computer-implemented method of claim 2, wherein determining the sensor reading at the first location comprises:
determining a set of time lengths between each signal pulse in the set of signal pulses;
determining the sensor reading based on mapping each time length in the set of time lengths to a corresponding value.

4. The computer-implemented method of claim 1, wherein the encoded response signal representing the sensor reading comprises a set of signal pulses having a first length with a modulated frequency for each signal pulse in the set of signal pulses.

5. The computer-implemented method of claim 4, wherein determining the sensor reading at the first location comprises:
determining a set of frequencies comprising frequencies for each signal pulse in the set of signal pulses; and
determining the sensor reading based on mapping each frequency in the set of frequencies to a corresponding value.

6. The computer-implemented method of claim 1, wherein the encoded response signal representing the sensor reading comprises a set of signal pulses having a first length with:
a modulated length of time between each signal pulse in the set of signal pulses; and
a modulated frequency for each signal pulse in the set of signal pulses.

7. The computer-implemented method of claim 1, wherein the sensor query signal has a frequency of about 10 megaHertz (MHz) to 1 gigaHertz (GHz).

8. The computer-implemented method of claim 1, wherein the first sensor is addressed at a first frequency that is encoded for the first sensor; and wherein the encoded response signal comprises the first frequency.

9. A system comprising:
one or more processors for executing the computer readable instructions, the computer readable instructions controlling the one or more processors to perform operations comprising:
operating a transceiver, disposed on a land based mobile vehicle, to transmit a sensor query signal to a first sensor, disposed underground, at a first location of one or more locations having one or more sensors, wherein the sensor query signal is a focused radio frequency (RF) beam that has a direction based on the first location, wherein the sensor query signal energizes a first power supply for the first sensor;
wherein energizing the power supply causes the first sensor to perform a sensor reading at the first location and transmit an encoded response signal representing the sensor reading, wherein the encoded response signal comprises a first response frequency, and wherein the first response frequency is generated based on a reflectance of the sensor query signal from an impedance of the first sensor; and
analyzing the encoded response signal to determine the sensor reading at the first location and an identity of the first sensor, wherein the identity of the first sensor is determined based on the first response frequency being within a first bandwidth,
wherein the first sensor is configured to monitor a temperature, a moisture, a soil content, and a pH level of a soil.

10. The system of claim 9, wherein the encoded response signal representing the sensor reading comprises a set of signal pulses having a first length with a modulated length of time between each signal pulse in the set of signal pulses.

11. The system of claim 10, further comprises:
determining a sensor location of the first sensor based on the orientation of a direction and signal angle of the encoded response signal.

12. The system of claim 9, wherein the encoded response signal representing the sensor reading comprises a set of signal pulses having a first length with a modulated frequency for each signal pulse in the set of signal pulses.

13. The system of claim 12, wherein determining the sensor reading at the first location comprises:
determining a set of frequencies comprising frequencies for each signal pulse in the set of signal pulses; and
determining the sensor reading based on mapping each frequency in the set of frequencies to a corresponding value.

14. A computer program product comprising a computer readable storage medium having program instructions embodied therewith, the program instructions executable by a processor to cause the processor to perform operations comprising:
controlling a transceiver, disposed on a land based mobile vehicle, to transmit a sensor query signal to a first sensor, disposed underground, at a first location of one or more locations having one or more sensors, wherein the sensor query signal is a focused radio frequency (RF) beam that has a direction based on the first location, wherein the sensor query signal energizes a first power supply for the first sensor;
wherein energizing the power supply causes the first sensor to perform a sensor reading at the first location and transmit an encoded response signal to the transceiver representing the sensor reading, wherein the encoded response signal comprises a first response frequency, and wherein the first response frequency is generated based on a reflectance of the sensor query signal from an impedance of the first sensor; and analyzing the encoded response signal to determine the sensor reading at the first location and an identity of the first sensor, wherein the identity of the first sensor is determined based on the first response frequency being within a first bandwidth, wherein the first sensor is configured to monitor a temperature, a moisture, a soil content, and a pH level of a soil.

15. The computer program product of claim 14, wherein the encoded response signal representing the sensor reading comprises a set of signal pulses having a first length with a modulated length of time between each signal pulse in the set of signal pulses; and wherein determining the sensor reading at the first location comprises:

determining a set of time lengths between each signal pulse in the set of signal pulses; and determining the sensor reading based on mapping each time length in the set of time lengths to a corresponding value.

16. The computer program product of claim 14, wherein the encoded response signal representing the sensor reading comprises a set of signal pulses having a first length with a modulated frequency for each signal pulse in the set of signal pulses; and wherein determining the sensor reading at the first location comprises:

determining a set of frequencies comprising frequencies for each signal pulse in the set of signal pulses; and determining the sensor reading based on mapping each frequency in the set of frequencies to a corresponding value.

* * * * *